United States Patent [19]

Noren et al.

[11] 4,026,192
[45] May 31, 1977

[54] MOTOR DRIVEN BY A PRESSURIZED FLUID MEDIUM FOR OPERATING AN IMPACTING TOOL IN A LINEAR DIRECTION

[75] Inventors: Carl Anders Noren, Saltsjo-Boo; Bertil Waldemar Sundin, Enskede, both of Sweden

[73] Assignee: Atlas Copco Aktiebolag, Nacka, Sweden

[22] Filed: May 17, 1974

[21] Appl. No.: 470,714

Related U.S. Application Data

[63] Continuation of Ser. No. 301,522, Oct. 27, 1972, abandoned.

[30] Foreign Application Priority Data

Nov. 12, 1971 Sweden ............................ 14497/71

[52] U.S. Cl. ...................................... 91/25; 83/617; 91/5; 91/27; 91/402; 92/85 B; 92/143; 188/316

[51] Int. Cl.² .......................................... F15B 15/22

[58] Field of Search ............ 91/5, 394, 24, 25, 357, 91/402, 408, 409, 392, 405, 27; 92/8, 10, 85, 143, 134; 188/312, 316; 83/617

[56] References Cited

UNITED STATES PATENTS

| 625,454 | 5/1899 | Maxim | 188/312 |
|---|---|---|---|
| 675,880 | 6/1901 | Carlisle | 91/392 X |
| 1,062,749 | 5/1913 | Townsend | 91/402 X |
| 1,384,216 | 7/1921 | Smith | 91/27 |
| 2,997,025 | 8/1961 | Ottestad | 91/25 |
| 3,105,414 | 10/1963 | Cvjetkovic | 91/392 X |
| 3,303,756 | 2/1967 | Geeson | 92/85 |
| 3,352,143 | 11/1967 | Bollar | 91/5 X |
| 3,363,513 | 1/1968 | Ottestad | 91/5 |
| 3,431,985 | 3/1969 | Bowen | 92/85 X |
| 3,596,562 | 8/1971 | Foster | 92/85 X |
| 3,695,378 | 10/1972 | Garrison | 92/85 X |
| 3,739,863 | 6/1973 | Wohlwend | 92/134 |
| 3,850,078 | 11/1974 | Polizzi | 92/8 X |
| 3,872,776 | 3/1975 | Kongelbeck | 92/12 |

FOREIGN PATENTS OR APPLICATIONS 262,354 4/1911 Germany .......................... 188/312

*Primary Examiner*—Martin P. Schwadron
*Assistant Examiner*—Abraham Hershkovitz
*Attorney, Agent, or Firm*—Eric Y. Munson

[57] ABSTRACT

A motor driven by a pressurized fluid medium for operating an impact tool in a linear direction adapted for metal stamping and high velocity milling comprising a housing and a piston unit. The latter comprises a drive piston, a piston rod and a tool. In addition, the motor includes a kinetic energy absorbing device comprising a hydraulic fluid chamber and a retard piston which is rigidly connected to said piston unit and arranged to reciprocate in said fluid chamber. The retard piston retards the piston unit at the end of the strokes only and is freely passed by hydraulic fluid during the working stroke. Cup-shaped means are provided to restrict said by-pass flow of hydraulic fluid at the end of the strokes and thereby protect the motor from excessive stresses during no-load conditions.

13 Claims, 5 Drawing Figures

MOTOR DRIVEN BY A PRESSURIZED FLUID MEDIUM FOR OPERATING AN IMPACTING TOOL IN A LINEAR DIRECTION

This is a continuation of application No. 301,522, filed Oct. 27, 1972, now abandoned.

BACKGROUND OF THE INVENTION

This invention relates to a motor driven by pressurized gas suitable and operating in a linear direction and is suitable for metal working such as punching and high velocity cropping. The motor is also suitable for other types of impact work such as forging and metal powder compacting.

One problem associated with machines of this type is the absorption of the kinetic energy of the hammer piston generated by impacts under non-load conditions and the absorption of the kinetic energy which remains in the hammer piston at the end of the work stroke. Previous solutions of this problem propose an arrangement of energy absorbing elements in the stationary part of the tool upon which the movable part of the tool strikes. Such energy absorption causes the tool to be subjected to very high stresses with consequent shortening of the life of the tool. Therefore, the tool costs will be very high especially as such a tool is more complicated than a tool without energy absorbing elements.

This invention proposes to solve this problem by providing a motor which comprises an energy absorbing device by means of which the tool is protected from inadvertently severe impacts.

BRIEF DESCRIPTION OF THE DRAWING

The invention will hereinafter be described with references to the FIGS. 1a and 1b are sectional schematic views showing a cropping machine provided with a motor according to the invention. In FIG. 1a the piston unit of the motor is in its upper, rear end position, which is the position of rest of the motor, while

DESCRIPTION OF DIFFERENT EMBODIMENTS

Figure 1A:
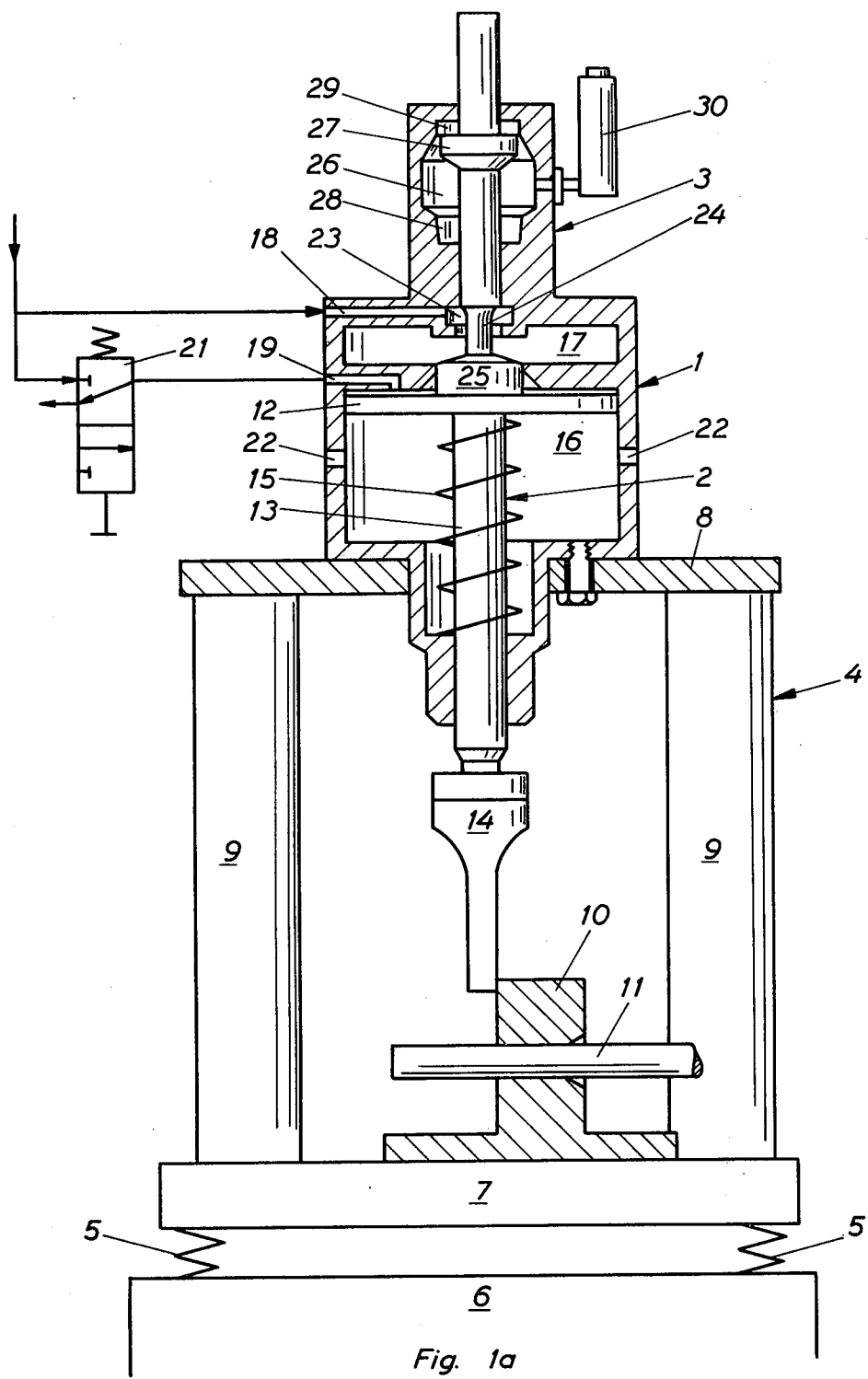
Figure 1B:
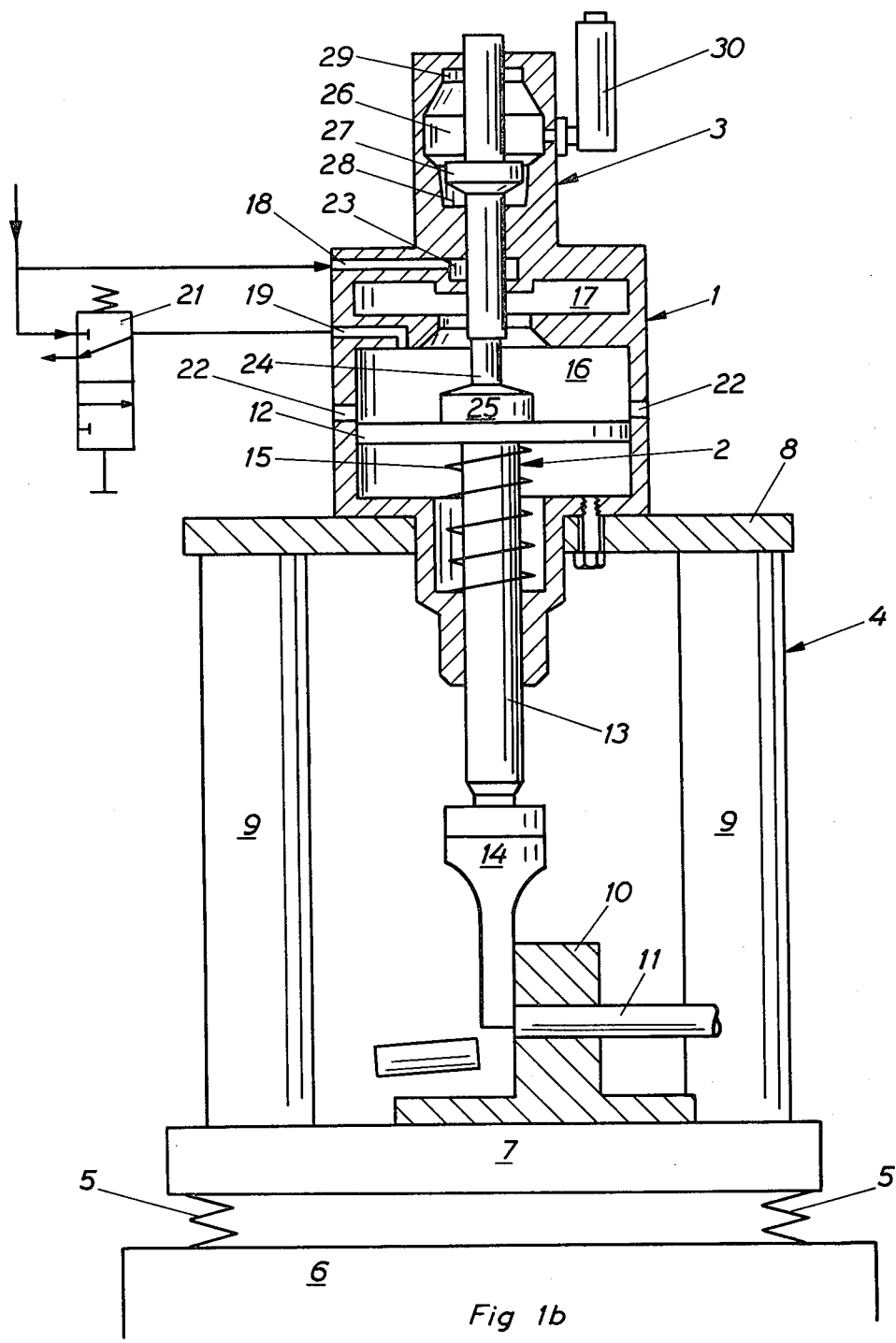
FIG. 1b shows the motor piston unit in its lower, forward end position.

The machine shown in FIGS. 1a and 1b comprises a motor consisting of housing 1, a piston unit 2 reciprocably guided therein and a hydraulic energy absorbing device 3. The machine includes a frame 4 which is mounted on a base which is isolated from the frame by means of springs 5.

The frame 4 consists of a bottom plate 7, a top plate 8 and four stanchions 9. The motor according to the invention is mounted on the top plate 8 and the stationary part 10 of the tool is located on the bottom plate 7. In this part of the tool there is introduced a billet 11 which is to be milled.

The piston unit 2 of the motor comprises a drive piston 12, a piston rod 13 and the movable part 14 of the working tool. Moreover, the piston unit 2 is provided with a return spring 15.

The housing 1 comprises a drive chamber 16 and a pressure chamber 17. To the latter is connected an inlet channel 18 for supplying pressure gas. To the drive chamber 16 is connected a channel 19 which is arranged to alternately supply and drain the drive chamber 16 through a control valve 21. The drive chamber 16 is provided with outlet ports 22.

The inlet channel 18 opens into an annular chamber 23 which surrounds the rear part of the piston rod 13. To provide communication between this chamber the pressure chamber 17, the piston rod 13 is formed with a waist 24. This waist is located so as to provide a passage between the chamber 23 and the pressure chamber 17 only when the piston unit 2 is in its rear end position (See FIG. 1a.)

Furthermore, the piston rod 13 is provided with a widened portion 25 which acts as a valve and cuts off the communication between the pressure chamber 17 and the drive chamber 16 when the piston unit 2 is in its rear return pistion.

At its rear end, the housing 1 is provided with a hydraulic energy absorbing device 3 comprising a damaging chamber 26 which is filled with hydraulic fluid and a retard piston 27. The latter comprises a rear extension of the piston rod 13. At its forward end, the damaging chamber 26 has a cup-shaped portion 28, the cross section of which relative to the cross section of the retard piston is such as to provide a narrow clearance between the wall of the chamber and the retard piston 27 as the latter enters the portion 28. At its rear end also, the chamber 26 has a cup-shaped portion 29 which is adjusted to the cross section of the retard piston in the same manner as the portion 28. The kinetic energy absorbing device also includes a hydraulic fluid receptacle 30 for keeping the fluid level constant in the chamber 26.

The motor operates as follows.

In the position of rest of the motor, the piston unit 2 is in its uppermost position which is shown in FIG. 1a. In this position the pressure chamber 17 is connected to the pressure gas source (not shown) via the chamber 23 and the inlet channel 18, whereby the pressure gas acts only on the small piston area which is defined by the widened portion 25 of the piston rod 13. The downwardly directed force which is created by the pressure gas does not, however, overcome the the upwardly directed force exerted by the return spring 15.

When the motor is in the position of rest, the control valve 21 is so adjusted that the upper part of the drive chamber communicates with the atmosphere through the channel 19. In order to produce a working stroke the valve 21 is shifted to a position in which the upper part of the drive chamber 16 communicates with the pressure gas source via the channel 19. Now, pressure gas acts upon the entire area of the drive piston 12 the force of which overcomes the force of the return spring 15 and the piston unit 2 starts moving downward. When the piston unit 2 has moved a short distance, the seal between the drive chamber and the pressure chamber 17 is broken thus admitting pressure gas also to enter into the drive chamber through the resultant opening.

The build-up of full gas pressure in the pressure chamber before every working stroke and a large flow area between the pressure chamber and the drive chamber is necessary in order to fill the drive chamber rapidly with pressure gas during the working stroke.

Upon the commencement of the working stroke the waist 24 is moved downward and out of the annular chamber 23, whereby the supply of pressure gas to the pressure chamber 17 from the channel 18 is shut off by the extension of piston rod 13 thus sealing the opening in the chamber 23. The purpose of this arrangement is to reduce the consumption of pressure gas.

During the downward movement of the piston unit 2, the air which is present in the upper part of the drive chamber 16 is exhausted through the outlet ports 22. This exhaust of air continues until the drive piston 12 arrives at a position which covers these ports. Upon passing this position, the piston 12 commences to compress the air which is entrapped ahead of the drive piston. After the drive piston has passed the outlet ports, any pressure gas remaining behind the drive piston may escape through the outlet ports 22. However, before the latter residual pressure gas has been evacuated, the movable part 14 of the tool has struck the billet 11 and completed the milling operation.

Concurrently with the commencement of the compression of the entrapped air in the forward part of the drive chamber 16 in the direction of movement of the piston 12, the retard piston 27 enters the corresponding forward cup-shaped part 28, whereby the fluid ahead of the piston in the direction of movement thereof is pressed back into the damping chamber 16 through the narrow clearance between the piston and the chamber wall. This creates a retarding force or damping action which effectively absorbs the kinetic energy which might remain in the piston unit after the work stroke has been completed. When the motor piston unit is designed for use as a punch machine or high speed milling apparatus the motor piston unit has to be retarded or braked at the end of every working stroke because there is always some excess energy to dissipate. On the other hand, when the invention is used for forging and compacting metal powder and the like there is, as a rule, no kinetic energy remaining and therefore the energy absorbing device has to dissipate only that energy which is created by strokes under the no-load conditions. The essential purpose of the energy absorbing device is to protect the tool as well as the motor against damage caused by excessive stresses.

As the piston unit 2 is retarded and the control valve 21 is shifted, the return stroke is completed by the spring 15. The upper part of the drive chamber 16 is now connected to the atmosphere through the conduit 19 and the valve 21. (The latter is preferably spring urged toward this position.) Therefore, no pressure is built up in the drive chamber during the return stroke. As the piston unit 2, during the return stroke approaches, its upper end position the connection between the pressure gas source and the pressure chamber 17 is opened as the waist 24 of the piston rod 13 moves into the annular chamber 23. Simultaneously, or immediately before, the connection between the pressure chamber 17 and the drive chamber 16 is shut off as the widened portion 25 of the piston rod 13 enters and seals the opening between these chambers. Now, full gas pressure may be built up in the pressure chamber 17. The piston unit 2 is in its position of rest and is ready to perform another working stroke.

If an abnormally high return velocity should be imparted to the piston unit 2 from the billet 11, the motor may be subjected to high stresses as this kinetic energy is absorbed. However, the hydraulic energy absorbing device 3 has a dual effect in that it is capable of retarding the piston unit 2 in the same manner as at the end of the work stroke. This effect results from the fact that the retard piston 27 enters the rear part 29 of the chamber 26 so that the liquid above the piston 27 is pressed back into the damping chamber between the piston and the chamber wall, thus generating a retarding force or braking action which effectively absorbs the recoil movement of the piston.

Successive work strokes are initiated by shifting the control valve 21 so that pressure gas is supplied to the drive chamber 16 by repeating the above described operating cycle.

Figure 2:
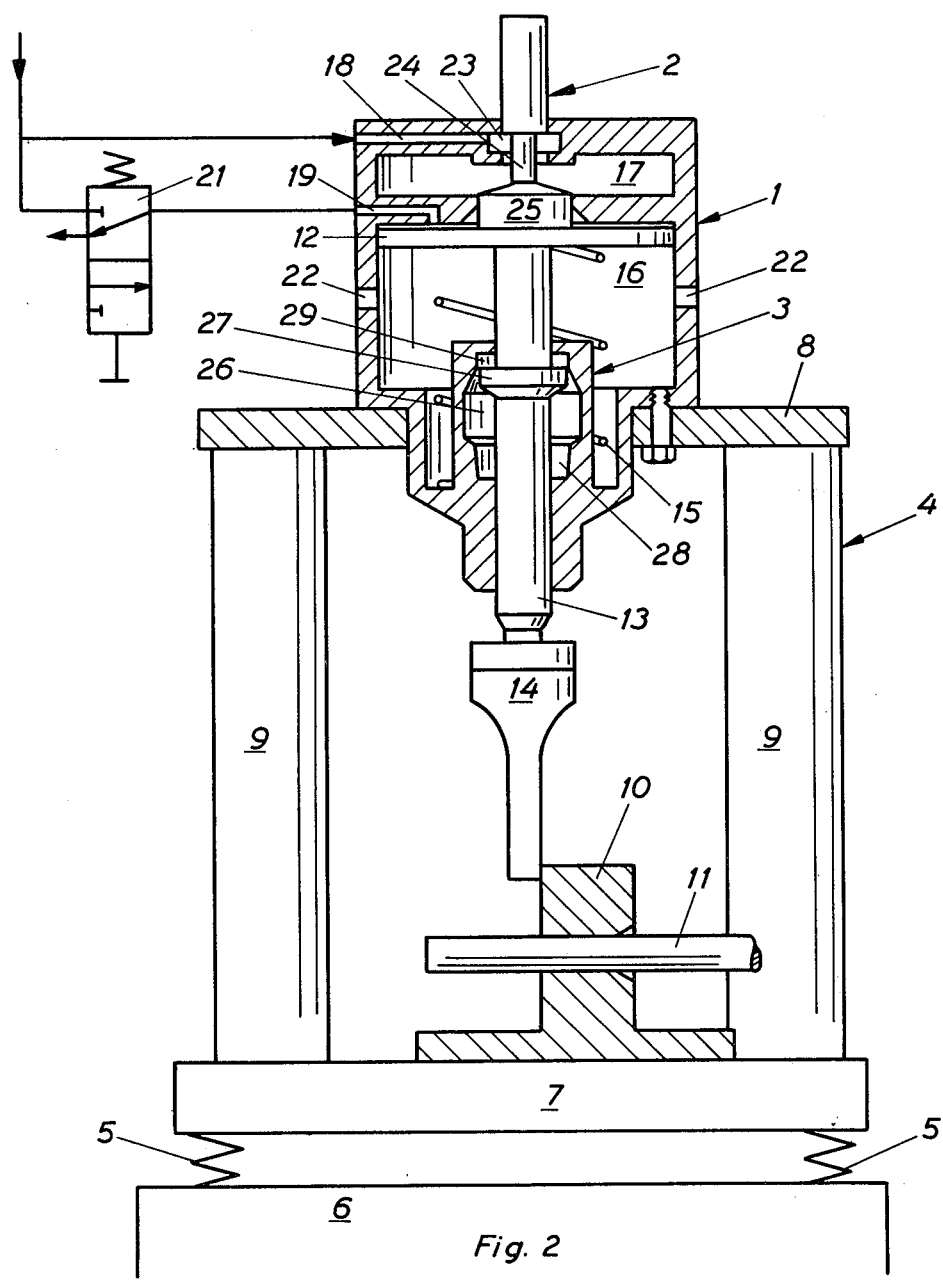
FIG. 2 is a similar view of a slightly modified motor according to the invention in which the energy absorbing device is located below, the drive piston of the motor.

FIG. 2 shows another motor according to the invention. This motor differs from the heretofore described motor in that the energy absorbing device 3 is in a different location with respect to the pressure and driving chambers. In the motor shown in FIG. 2, the energy absorbing device 3 as seen in the drawing is located below the drive chamber 16 in which the piston rod 13 reciprocates. The retard piston comprises an annular flange on the piston rod 13. The operation of the energy absorbing device corresponds to that of the heretofore described device. The purpose of this arrangement is to make a more compact motor which is lower in height.

Figure 3:
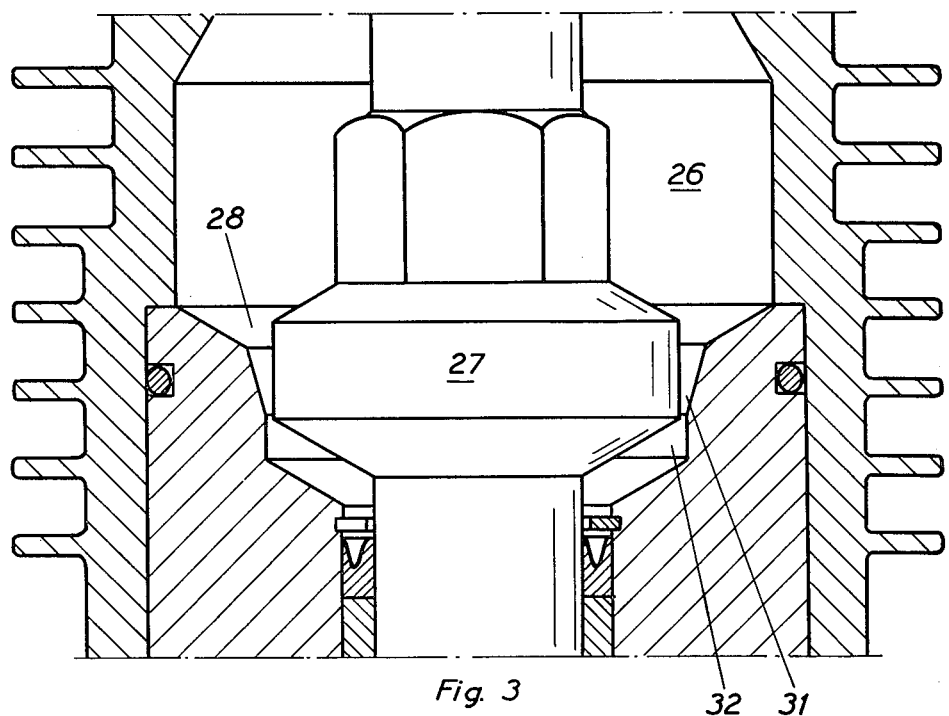
FIGS. 3 and 4 are fractional cross sections showing energy absorbing devices having different retarding force characertistics.
Figure 4:
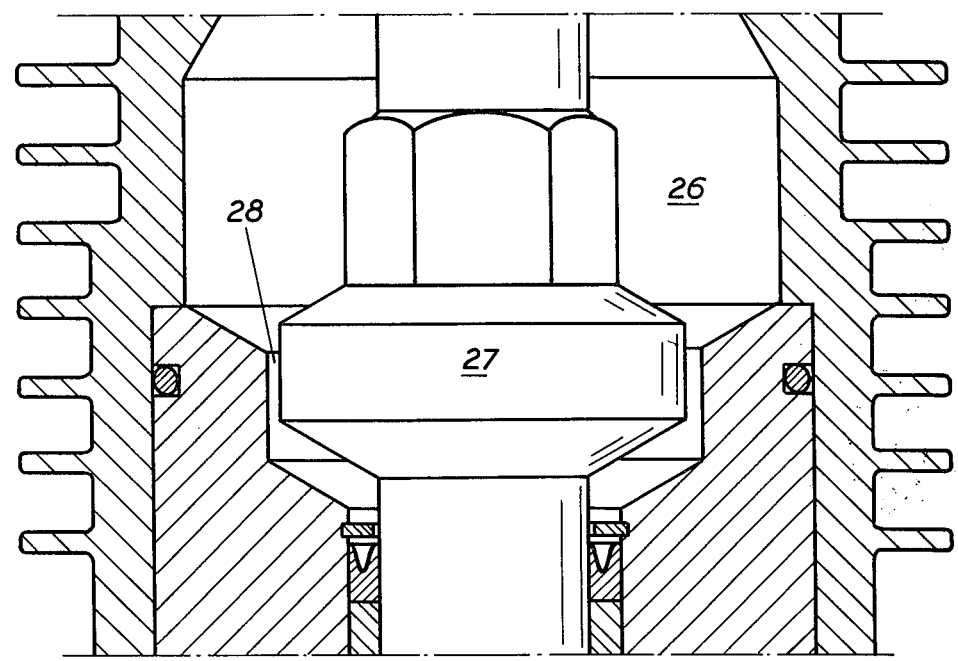

FIGS. 3 and 4 show energy absorbing devices having different retarding force characteristics. In the device shown in FIG. 3 the forward part of the chamber 26 comprises a conical portion 31 and a cylindrical portion 32. This inner wall configuration of the cup-shaped portions is advantageous in that is produces a relatively smooth start of the retardation or braking portion. The retarding force is then successively increased as the retard piston enters deeper into these parts of the chamber 26. The energy absorbing device according to FIG. 4 is cylindrical along its entire length and produces a rougher and more sudden start of the retarding or braking action.

The configurations shown in the figures are merely examples of how the retarding force characteristic can be varied. Of cource, there are other ways of varying the magnitude of the retarding force, for instance by changing the width of the clearance between the retard piston and chamber wall.

The invention is not limited to the described and shown embodiments but can be freely varied within the scope of the claims.

What we claim is:

1. A reciprocating linear high acceleration impact tool driven by a pressure fluid to deliver high impact energy to an object during the impact strokes, comprising:
   a. a housing defining a drive chamber, a pressure chamber for storing pressure fluid and a damping chamber containing a hydraulic fluid for absorbing surplus kinetic energy generated by the impact strokes;
   b. an inlet port for admitting pressure fluid into said pressure chamber;
   c. passage means for passing pressure fluid from said pressure chamber into said drive chamber
   d. a piston unit comprising a piston rod mounted to reciprocate within said housing and extending through said chambers and having one end thereof extending externally of said chambers for carrying an impact tool;
   e. said piston unit including:
      i. a driven piston arranged to reciprocate within said drive chamber;
      ii. a retard piston arranged to reciprocate within said damping chamber;

iii. a control piston for controlling the admission of pressure fluid from said pressure chamber to said drive chamber;
f. means effective to initiate an impact stroke upon said drive piston;
g. said control piston being effective to maintain communication between said pressure chamber and said drive chamber closed during the position of rest of said drive piston and during the initiating portion of the impact stroke and to open said communication after the piston has moved a predetermined distance to thereby impart an accelerating force to the piston;
h. said piston unit additionally including means for maintaining said inlet port open during the position of rest of the drive piston and closed during the impact stroke.

2. A tool according to claim 1, in which said means for maintaining said inlet port open comprises a waist portion extending through said inlet port to provide a clearance for admitting pressure fluid into the pressure chamber during the position of rest of the drive piston.

3. A tool according to claim 1, in which the control piston is fixed on the piston rod.

4. A motor driven by a pressurized fluid medium for operating an impact tool in a linear direction, comprising:
a. a walled housing defining a drive chamber, a pressure chamber for storing pressure fluid and a damping chamber containing a hydraulic fluid for absorbing surplus kinetic energy generated by the impact stroke of the motor;
b. an inlet port for admitting pressure fluid into said pressure chamber;
c. a piston unit comprising a piston rod mounted to reciprocate within said chambers and a driven piston arranged to reciprocate within said drive chamber;
d. valve means for controlling the movement of said piston unit;
e. said piston rod having one end thereof extending externally of said drive chamber for carrying the impact tool and comprising a co-axial retard piston arranged to reciprocate within said damping chamber and a control piston for controlling the admission of pressure fluid from said pressure chamber to said drive chamber;
f. said damping chamber having such dimension as to provide an annular space between the walls of said damping chamber and said retard piston for permitting said retard piston to move substantially unretarded downwards during the work stroke of said drive piston;
g. said damping chamber furthermore having a cup-shaped bottom portion of such dimension as to provide a narrowed clearance between the walls thereof and said retard piston and having a bottom opening accomodating said piston rod, said clearance being effective to restrict hydraulic fluid flow into said annular space as said retard piston enters said cup-shaped portion during the end of the work stroke of the piston;
h. said control piston being effective to maintain communication between said pressure chamber and said drive chamber closed during the position of rest of said drive piston and during the initiating portion of the impact stroke and to open said communication after the piston has moved a predetermined distance to thereby impart an accelerating force to the piston; and
i. said piston unit additionally including means for maintaining said inlet port open during the position of rest of the drive piston and closed during the impact stroke.

5. A motor according to claim 4, in which said cup-shaped bottom portion is formed with an upper frusto-conical portion of decreasing width.

6. A motor according to claim 5, in which said damping chamber terminates in a second cup-shaped top portion of such dimension as to provide a narrowed clearance between the walls thereof and the retard piston for restricting hydraulic fluid flow into said annular space as the retard piston enters said second cup-shaped portion during the return stroke of the piston.

7. A motor according to claim 4, in which partition walls are provided between said chambers having openings for accomodating said piston rod, said piston rod being provided with first valve means for admitting pressure fluid into said pressure chamber and into said drive chamber.

8. A motor according to claim 7, in which second valve means are provided for admitting pressure fluid into said drive chamber to initiate the work stroke, whereupon said first valve means are arranged to admit pressure fluid into said drive chamber to force said drive piston downwards to complete the work stroke against a yielding spring force, said drive chamber being provided with ports for evacuating fluid entrapped in said drive chamber.

9. A motor according to claim 4, in which said cup-shaped bottom portion is tapered so as to make said narrow clearance decrease as the retard piston approaches the forward end of said portion.

10. A reciprocating linear high acceleration tool driven by a pressure fluid for operating a working implement to deliver high impact energy against an object during one of the strokes of the tool, comprising:
a. a housing defining a drive chamber, a pressure chamber for accumulating pressure fluid, and a damping chamber for absorbing surplus kinetic energy generated by said energy delivering work stroke of the tool;
b. an inlet port for admitting pressure fluid into said pressure chamber;
c. a reciprocable piston unit carrying said working implement, and comprising a piston rod mounted to reciprocate within said chambers, a drive piston in said drive chamber, a retard piston in said damping chamber; and a control piston for controlling the admission of pressure fluid from said pressure chamber to said drive chamber;
d. valve means for controlling the movement of said piston unit;
e. said damping chamber having such dimension as to permit substantially unrestricted fluid flow from the front end of said retard piston to the rear end thereof during the main part of said work stroke of the tool;
f. said damping chamber furthermore being provided with means at the bottom portion thereof for restricting fluid flow past said retard piston during the end of said work stroke of the tool;
g. said control piston being effective to maintain communication between said pressure chamber and said drive chamber closed during the position of rest of said drive piston and during the initiating portion of the impact stroke and to open said communication after the piston has moved a predetermined distance to thereby impart an accelerating force to the piston;

h. said piston unit additionally including means for maintaining said inlet port open during the position of rest of the drive piston and closed during the impact stroke.

11. A tool according to claim 10, in which partition walls are provided between said chambers having openings for accomodating said piston rod, first valve means on said piston unit for controlling the admission of pressure fluid to said pressure chamber, and a second valve means on said piston unit for controlling the admission of pressure fluid to said drive chamber from said charge chamber.

12. A tool according to claim 11, in which third valve means are provided for producing forwardly directed force at a setting thereof, said force acting upon said piston unit to initiate the work stroke, whereupon said second valve means are arranged to admit pressure fluid into said drive chamber to force said drive piston downwards to complete the work stroke.

13. A tool according to claim 12, in which said third valve means are arranged to admit a small quantity of pressure fluid into said drive chamber to initiate the work stroke, whereupon said second valve means are arranged to admit pressure fluid into said drive chamber to force said drive piston downwards to complete the work stroke against a yielding spring force, said drive chamber being provided with ports for evacuating fluid entrapped in said drive chamber.

* * * * *